(12) United States Patent
Ehler et al.

(10) Patent No.: US 11,364,794 B2
(45) Date of Patent: Jun. 21, 2022

(54) PLASTIC TANK WITH A POT-LIKE INSTALLATION BODY

(71) Applicant: TI AUTOMOTIVE TECHNOLOGY CENTER GMBH, Rastatt (DE)

(72) Inventors: Alex Ehler, Rastatt (DE); Albert J. Boecker, Ettlingen (DE); Patrick Gmünd, Karlsruhe (DE); Peter Grauer, Steinweiler (DE); Gerrit Michaelis, Durmersheim (DE); Matthias B. Olbrich, Rastatt (DE); Ahmad Chehade, Malsch (DE); Moez Haouala, Karlsruhe (DE)

(73) Assignee: TI AUTOMOTIVE TECHNOLOGY CENTER GMBH, Rastatt (DE)

( * ) Notice: Subject to any disclaimer, the term of this patent is extended or adjusted under 35 U.S.C. 154(b) by 0 days.

(21) Appl. No.: 17/011,621

(22) Filed: Sep. 3, 2020

(65) Prior Publication Data

US 2020/0398660 A1   Dec. 24, 2020

Related U.S. Application Data

(62) Division of application No. 15/771,633, filed as application No. PCT/EP2016/075742 on Oct. 26, 2016, now Pat. No. 11,104,220.

(30) Foreign Application Priority Data

Nov. 2, 2015  (DE) .................... 10 2015 221 377.3

(51) Int. Cl.
*B60K 15/03*   (2006.01)

(52) U.S. Cl.
CPC ............... *B60K 15/03177* (2013.01); *B60K 2015/03111* (2013.01); *B60K 2015/03467* (2013.01)

(58) Field of Classification Search
CPC .... B60K 15/03177; B60K 2015/03467; B60K 2015/03111
USPC ........................................................ 220/562
See application file for complete search history.

(56) References Cited

U.S. PATENT DOCUMENTS

| | | |
|---|---|---|
| 4,974,570 A | 12/1990 | Szwargulski et al. |
| 5,044,526 A | 9/1991 | Sasaki et al. |
| 5,415,146 A | 5/1995 | Tuckey |
| 5,647,329 A | 7/1997 | Bucci et al. |
| 5,931,353 A | 8/1999 | Guyomard et al. |
| 6,283,731 B1 | 9/2001 | Yoshioka |
| 6,499,500 B2 | 12/2002 | Rosseel |
| 6,679,399 B2 | 1/2004 | Franjo et al. |
| 6,712,234 B2 * | 3/2004 | Boecker ................. B29C 49/20 220/563 |
| 6,923,164 B1 | 8/2005 | Mitsudou et al. |
| 7,201,151 B2 | 4/2007 | Hayakawa |

(Continued)

FOREIGN PATENT DOCUMENTS

EP             0203244 B1      9/1988

*Primary Examiner* — Ernesto A Grano
(74) *Attorney, Agent, or Firm* — Dickinson Wright PLLC

(57) ABSTRACT

The present disclosure relates to a plastic tank, particularly a plastic fuel tank, with a pot-like installation body arranged on the inside of the tank, as well as a method for producing the same. According to the present disclosure, a ring body is provided which is arranged on an end portion of the installation body, wherein the ring body is engaged in an undercut section in the tank wall, and the installation body is engaged in the ring body.

16 Claims, 3 Drawing Sheets

(56) References Cited

U.S. PATENT DOCUMENTS

| | | |
|---|---|---|
| 7,290,675 B2 | 11/2007 | Gombert et al. |
| 7,857,016 B2 | 12/2010 | Baudoux |
| 7,886,721 B2 | 2/2011 | Sanden |
| 7,980,227 B2 | 7/2011 | Eck et al. |
| 7,992,546 B2 | 8/2011 | Eck et al. |
| 8,240,332 B1 | 8/2012 | Matusek et al. |
| 8,377,368 B2 | 2/2013 | Grauer |
| 8,973,778 B2 | 3/2015 | Ehler et al. |
| 8,991,637 B2 | 3/2015 | Boecker et al. |
| 9,061,580 B2 | 6/2015 | Gardien et al. |
| 9,168,830 B2 | 10/2015 | Park |
| 9,592,631 B2 * | 3/2017 | Boecker .............. B29C 49/4242 |
| 9,862,267 B2 | 1/2018 | Gerhardt et al. |
| 10,145,341 B2 | 12/2018 | Kim et al. |
| 2005/0284872 A1 | 12/2005 | Gombert et al. |
| 2008/0038497 A1 * | 2/2008 | Nemoto .............. B29C 49/4273 |
| | | 428/35.7 |
| 2011/0140314 A1 * | 6/2011 | Grauer .................... B29C 51/12 |
| | | 264/516 |
| 2014/0239557 A1 * | 8/2014 | Boecker .............. B29C 49/4242 |
| | | 264/516 |
| 2015/0367725 A1 | 12/2015 | Parola et al. |

\* cited by examiner

PLASTIC TANK WITH A POT-LIKE INSTALLATION BODY

CROSS-REFERENCE TO RELATED APPLICATIONS

This application is a divisional of U.S. patent application Ser. No. 15/771,633, filed Apr. 27, 2018, which is a 35 U.S.C. § 371 national phase of PCT International Application No. PCT/EP2016/075742, filed Oct. 26, 2016, which claims the benefit of priority under 35 U.S.C. § 119 to German Patent Application No. 10 2015 221 377.3, filed Nov. 2, 2015, the contents of which are incorporated herein by reference in their entirety.

FIELD

The present disclosure relates to a plastic tank, particularly a plastic fuel tank, with a pot-like installation body arranged on the inside of the tank, as well as a method for installing an installation body in a plastic tank, preferably a tank module in a plastic fuel tank.

BACKGROUND

In the case of fuel tanks, the so-called tank module may be securely fastened on the tank bottom, with the tank module being an installation body that accommodates a specific fuel volume and in which a fuel pump is arranged, and so said fuel pump does not run dry even at a low fuel filling level in the tank or no pumping gaps are caused.

SUMMARY

The present disclosure provides apparatus and methods for securely fastening the installation body on the tank bottom in a safe manner and without great installation effort or extensive additional components.

For example, in order to avoid plastic welding processes during the arrangement of the installation body, a ring body, which is arranged on an end portion of the installation body, is provided according to the present disclosure, wherein the ring body is engaged in an undercut section in the tank wall, and the installation body is engaged in the ring body. The installation body is preferably designed as a tank module for receiving a fuel pump and storing a fuel volume.

The undercut section in the tank wall can be produced in a blow mold by means of sliders which act on the tank wall from outside and are movably arranged in the blow mold. Alternatively, the undercut section can be produced in the tank wall by a molded part placed in a blow mold.

Expediently, the undercut section is essentially designed so as to be circular and can consist of at least two, preferably three, separate parts.

In a preferred embodiment of the present disclosure, the ring body has outward facing retaining ribs on the side of the tank wall, the free ends of which lie on a circle prior to the engaging of the installation body in the ring body; the diameter d of said circle being smaller than the diameter D of a circle which defines the free inner diameter of the undercut section. In addition, the ring body can have a cylindrical wall section with openings, in which engaging protrusions on an outer wall section of the installation body can be engaged.

Expediently, the outer wall section of the installation body having the engaging protrusions is essentially designed so as to be cylindrical, and having a diameter which is no greater than the diameter D of the free inner diameter of the undercut section minus the thickness of the wall section of the ring body having the openings. If the above-mentioned dimensions are precisely synchronized, a secure attachment of the installation body without play on the tank wall is ensured.

The method according to the present disclosure for installing an installation body in a plastic tank, preferably a tank module in a plastic fuel tank, comprises the following steps:
Introduction of an undercut section in a tank wall on the inside of the tank;
Pre-assembly of a ring body and the installation body;
Positioning of retaining ribs of the ring body in the undercut section;
Pressing the installation body into the ring body, wherein the installation body is engaged in the ring body, and the ring body is engaged in the undercut section.

When engaging the ring body in the undercut section, a section of the ring body, which carries the retaining ribs, can be spread open, and the retaining ribs can be pressed into the undercuts of the undercut section. Furthermore, when the installation body engages in the ring body, engaging protrusions on a cylindrical wall section of the installation body, which is introduced into the ring body, can be engaged in openings in a complementary wall section of the ring body.

Preferably, the undercut section in the tank wall is produced from outside in the course of a molding of the tank in a blow mold. This can be accomplished by means of sliders arranged in the blow mold or alternatively by a molded part placed in a blow mold, around which the tank wall is formed during blow molding while creating the undercut section. While sliders in the blow mold can be reused for each new molding process, a new molded part must be provided for each new tank with said molded part remaining in the tank wall; however, in such case, the sliders in the blow mold can be omitted, and so the blow mold is designed less elaborately.

According to another aspect of the present disclosure, a method for installing an installation body in a plastic tank includes the steps of forming an undercut section on a tank wall, arranging a ring body an end of the installation body to define a pre-installation configuration, setting up an intermediate position by locating a bottom-side end of the ring body with the installation body in the undercut section on the tank wall, and inserting the bottom-side end of the ring body into the undercut section by pushing the installation body into the ring body to define an installed configuration.

According to a further aspect of the present disclosure, the step of forming the undercut section on the tank wall includes the steps of locating a molded part between a blow mold and an outer side of the tank wall, and engulfing the molded part by a part of the tank wall during a blow molding process.

According to a further aspect of the present disclosure, the step of forming the undercut section on the tank wall includes the step of laterally arranging sliders in a blow mold relative to a recessed area formed in the tank wall, and moving the sliders toward one another.

According to a further aspect of the present disclosure, the undercut section is formed to protrude toward an inner side of the tank.

According to a further aspect of the present disclosure, the step of arranging a ring body on an end of the installation body includes the step of inserting a section of the end of the installation body in a space formed in an interior of the ring body for holding together in a frictionally engaged manner.

According to a further aspect of the present disclosure, the bottom-side end of the ring body is formed with at least one retaining rib so that the retaining rib is pressed into the undercut section. A first diameter d defined by a circumcircle of the retaining ribs is smaller than a second diameter D defined by an inside circle of undercut parts formed in the undercut section. In the step of inserting the bottom-side end of the ring body into the undercut section by pushing the installation body into the ring body, an area of the retaining ribs is spread open and the retaining ribs are securely fastened into the undercut section. In addition, engaging protrusions formed on a cylindrical wall of the installation body is securely engaged with openings formed in complementary wall of the ring body.

BRIEF DESCRIPTION OF THE DRAWINGS

In the following, the present disclosure is described in more detail using an embodiment schematically depicted in the drawing.

DETAILED DESCRIPTION

Figure 1A:
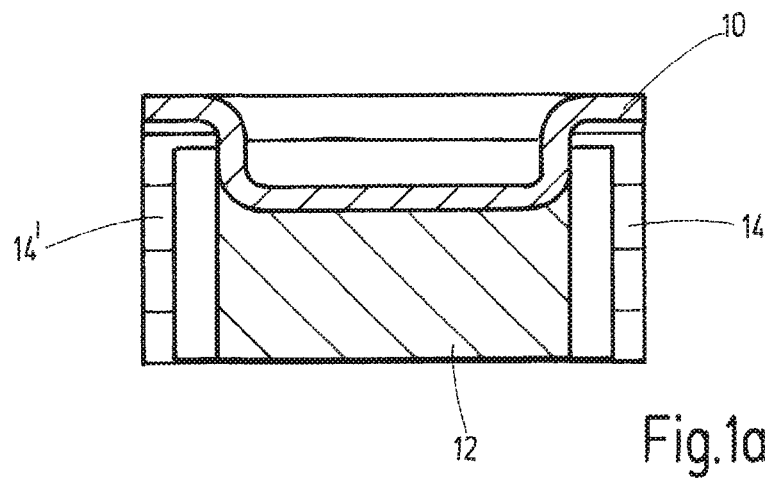
FIGS. 1a and 1b show a schematic depiction of the production of an undercut section by means of sliders in a blow mold.

A preferred embodiment of the present disclosure will be described in conjunction with the accompanying drawings. The sizes, materials, and other specific numerical values in the following description of the embodiment are simply by way of examples for ease of understanding of the present disclosure and should not be construed to limit the present disclosure unless otherwise specified. Note that in the description and the drawings, components having substantially the same functions and configurations are designated by the same reference characters, so that their description is not repeated, while components not directly relevant to the present disclosure are not shown.

Figure 1B:
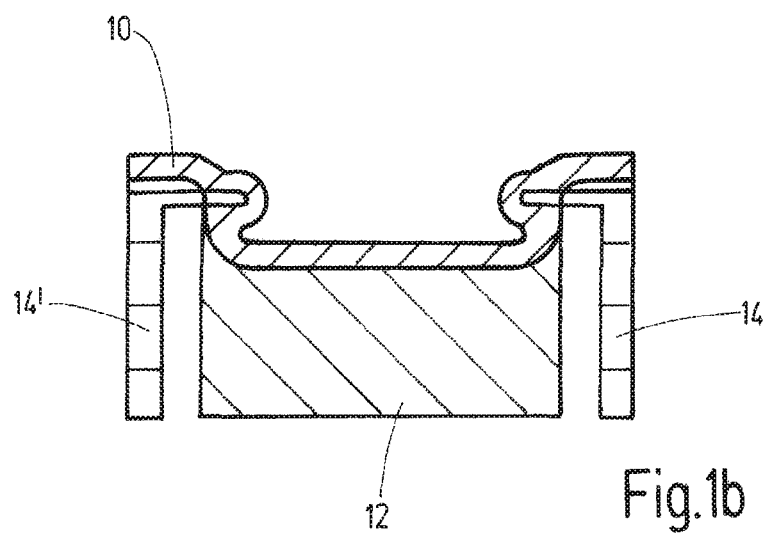

FIG. 1 shows in a simplified manner the production of an undercut section in a tank wall 10 of a plastic tank, which is otherwise not depicted in more detail, in a blow mold 12. The tank wall 10 is molded in a slightly recessed, approximately circular area of the blow mold 12 (FIG. 1a), and so sliders 14, 14', which are arranged laterally relative to the recessed area, can be moved toward one another (FIG. 1b) and thereby mold the flowably heated material of the tank wall 10 at a specific distance from the bottom of the recessed area, thus forming the undercut section. It is conceivable that more than two sliders are used which are arranged at equal or unequal circumferential distances on a circle and each mold a circular segment-shaped area of the undercut section.

Figure 2:
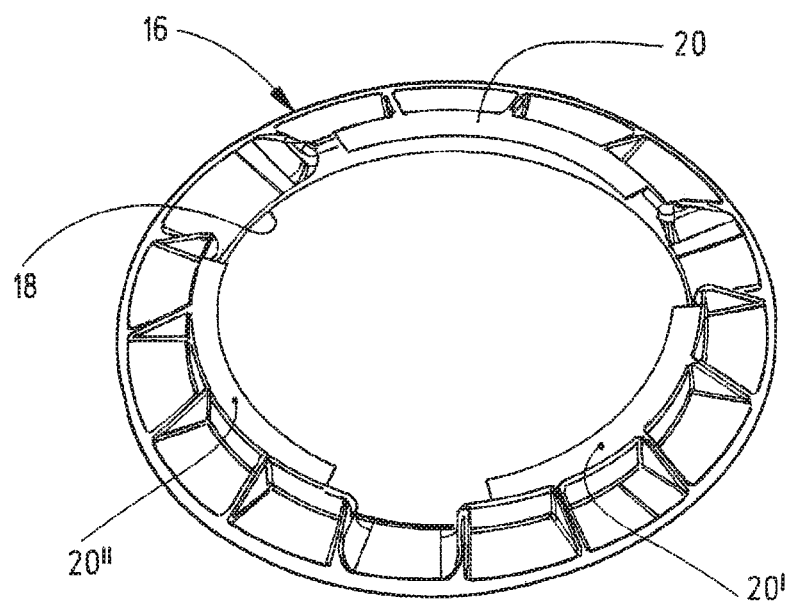
FIG. 2 shows a perspective view of a molded part for producing an undercut section in a blow mold, wherein the molded part is placed in the blow mold and acts on the tank wall from outside.

Alternatively, the molded part 16 shown in FIG. 2 can be used for producing the undercut section. The molded part is annular with a central opening 18 which defines the diameter of the undercut section. Prior to the blow molding process, the molded part 16 is placed in the blow mold in the position, in which the undercut section is supposed to be created. When the tank wall is molded, the molded part 16 is located between the blow mold and the outer side of the tank wall. At a distance from an imaginary base plane, the molded part 16 has three inward facing, pitch-circular ribs 20, 20', 20" which are engulfed by the material of the tank wall, and which form three corresponding undercut parts on the inner side of the tank wall (cf. FIG. 3). After the blow molding, the molded part is largely molded into the tank wall and thus remains on the tank; it is therefore a non-reusable lost part.

Figure 3:
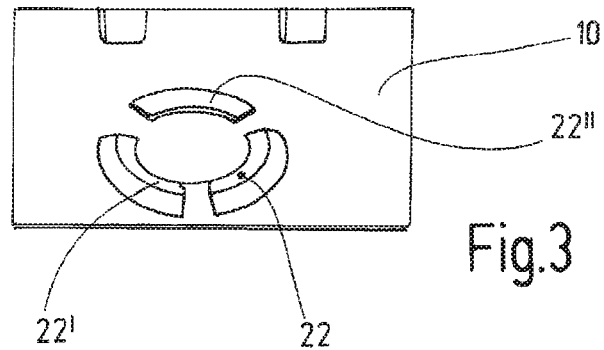
FIG. 3 shows a schematic view of an undercut section on the inner side of a tank wall.

FIG. 3 shows a view of the inner wall of the tank with the undercut section formed by the three undercut parts 22, 22', 22", which can be formed by means of one of the two methods described above.

Figure 4:
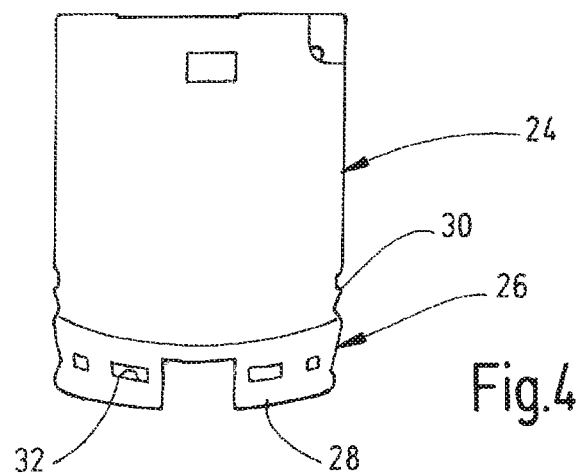
FIG. 4 shows a schematic view of an installation body and a ring body in a preassembled state.
Figure 5:
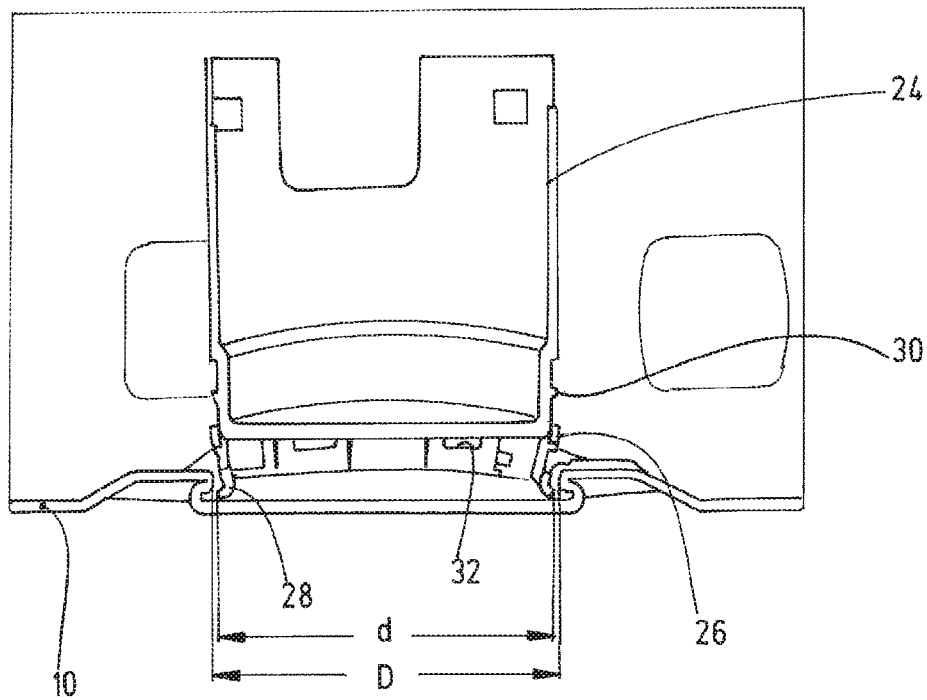
FIG. 5 shows the positioning of the installation body and the ring body according to FIG. 4 in the undercut section prior to the final assembly.

FIG. 4 shows an installation body 24, which is designed as a tank module, and a ring body 26. The installation body 24 and the ring body 26 are in a preassembled or partially assembled state, in which a section of the installation body 24 on the bottom side is inserted to some extent in a space formed in the interior of the ring, and the two parts are held together at most in a frictionally engaged manner. In the area of its free or bottom-side end, the ring body 26 has a multiplicity of outward facing, segmented retaining ribs 28, the circumcircle of which, as can be seen, has a diameter d, which is smaller than the diameter D of an inside circle of the undercut parts 22, 22', 22", i.e. the area of the ring body 26 with the retaining ribs 28 can be inserted into the undercut section past the undercut parts 22, 22', 22" up to the tank wall, as is shown in FIG. 5. Naturally, the ring body 26 and the installation body 24 can also be installed separately and consecutively in this order in the undercut section.

Figure 6:
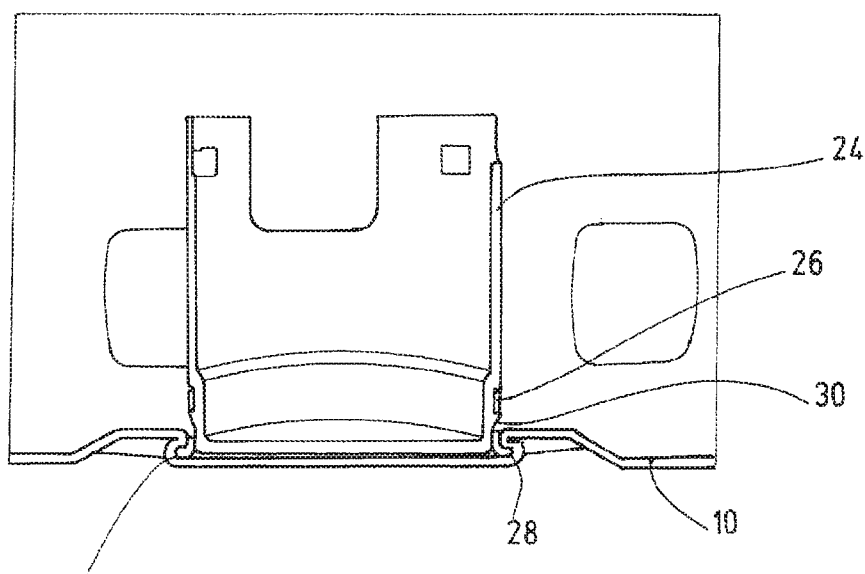
FIG. 6 shows the end position of the installation body and the ring body according to FIG. 4 after installation in the undercut section.

FIG. 5 shows the combination of installation body 26 and ring body 26 inserted in the undercut section. From this intermediate position, the installation body is pushed in the direction of the tank wall 10. As a result, the area of the retaining ribs 28 of the ring body 26 is spread open, and the retaining ribs 28 enter the undercuts. Simultaneously, engaging protrusions 30 engage on the outside of the section on the bottom side of the installation body 24 in complementary openings 32 in the cylindrical wall of the ring body 26, and so the ring body 26 is securely fastened in the undercut section, and the installation body 24 is securely fastened in the ring body, as is shown in FIG. 6. The respective dimensions of the undercut section, the ring body 26, and the installation body 24 are selected such that the installation body is installed essentially without play on the tank wall 10.

In summary, the following must be noted: the present disclosure relates to a plastic tank, particularly a plastic fuel tank, with a pot-like installation body 24 arranged on the inside of the tank, as well as a method for producing the same. According to the present disclosure, a ring body 26 is provided which is arranged on an end portion of the installation body 24, wherein the ring body 26 is engaged in an undercut section in the tank wall 10, and the installation body 24 is engaged in the ring body 26.

What is claimed is:
1. A method for installing an installation body in a plastic tank, the method comprising the steps of:
    introducing of an undercut section in a tank wall on the inside of the tank;
    providing a ring body having retaining ribs and the installation body partially assembled with the rind body;

positioning the retaining ribs of the ring body in the undercut section; and pressing the installation body into the ring body, wherein the installation body is snapped into the ring body such that the installation body is fully assembled with the rind body, and the ring body into the undercut section.

2. The method according to claim 1, wherein, when the ring body engages in the undercut section, a section of the ring body carrying the retaining ribs is spread open, and the retaining ribs are pressed into the undercuts of the undercut section.

3. The method according to claim 1, wherein, when the installation body engages in the ring body, engaging protrusions formed on a cylindrical wall section of the installation body, which is introduced into the ring body, and engages in openings in a complementary wall section of the ring body.

4. The method according to claim 1, wherein the undercut section in the tank wall is produced from the outside in the course of molding the tank in a blow mold.

5. The method according to claim 4, wherein the undercut section is produced by sliders arranged in the blow mold.

6. The method according to claim 4, wherein the undercut section is produced by a molded part placed in the blow mold.

7. The method according to claim 1, wherein the installation body is a tank module and the plastic tank is a fuel tank.

8. A method for installing an installation body in a plastic tank, the method comprising the steps of:

forming an undercut section on a tank wall;

arranging a ring body on an end of the installation body to define a pre-installation configuration such that the installation body is partially assembled with the ring body;

setting up an intermediate position by locating a bottom-side end of the ring body partially assembled with the installation body in the undercut section on the tank wall; and inserting the bottom-side end of the ring body into the undercut section by pushing the installation body into the ring body to define an installed configuration such that the installation body is fully assembled with the ring body.

9. The method according to claim 8, wherein the step of forming the undercut section on the tank wall includes the steps of locating a molded part between a blow mold and an outer side of the tank wall, and engulfing the molded part by a part of the tank wall during a blow molding process.

10. The method according to claim 8, wherein the step of forming the undercut section on the tank wall includes the step of laterally arranging sliders in a blow mold relative to a recessed area formed in the tank wall, and moving the sliders toward one another.

11. The method according to claim 8, wherein the undercut section is formed to protrude toward an inner side of the tank.

12. The method according to claim 8, wherein the step of arranging a ring body on an end of the installation body includes the step of inserting a section of the end of the installation body in a space formed in an interior of the ring body for holding together in a frictionally engaged manner.

13. The method according to claim 8, wherein the bottom-side end of the ring body is formed with at least one retaining rib so that the retaining rib is pressed into the undercut section.

14. The method according to claim 13, wherein a first diameter d defined by a circumcircle of the retaining ribs is smaller than a second diameter D defined by an inside circle of undercut parts formed in the undercut section.

15. The method according to claim 13, wherein in the step of inserting the bottom-side end of the ring body into the undercut section by pushing the installation body into the ring body, an area of the retaining ribs is spread open and the retaining ribs are securely fastened into the undercut section.

16. The method according to claim 15, wherein engaging protrusions formed on a cylindrical wall of the installation body is securely engaged with openings formed in complementary wall of the ring body.

* * * * *